(No Model.)
B. W. HUEY.
STOVE PIPE CLEANER.
No. 364,255. Patented June 7, 1887.
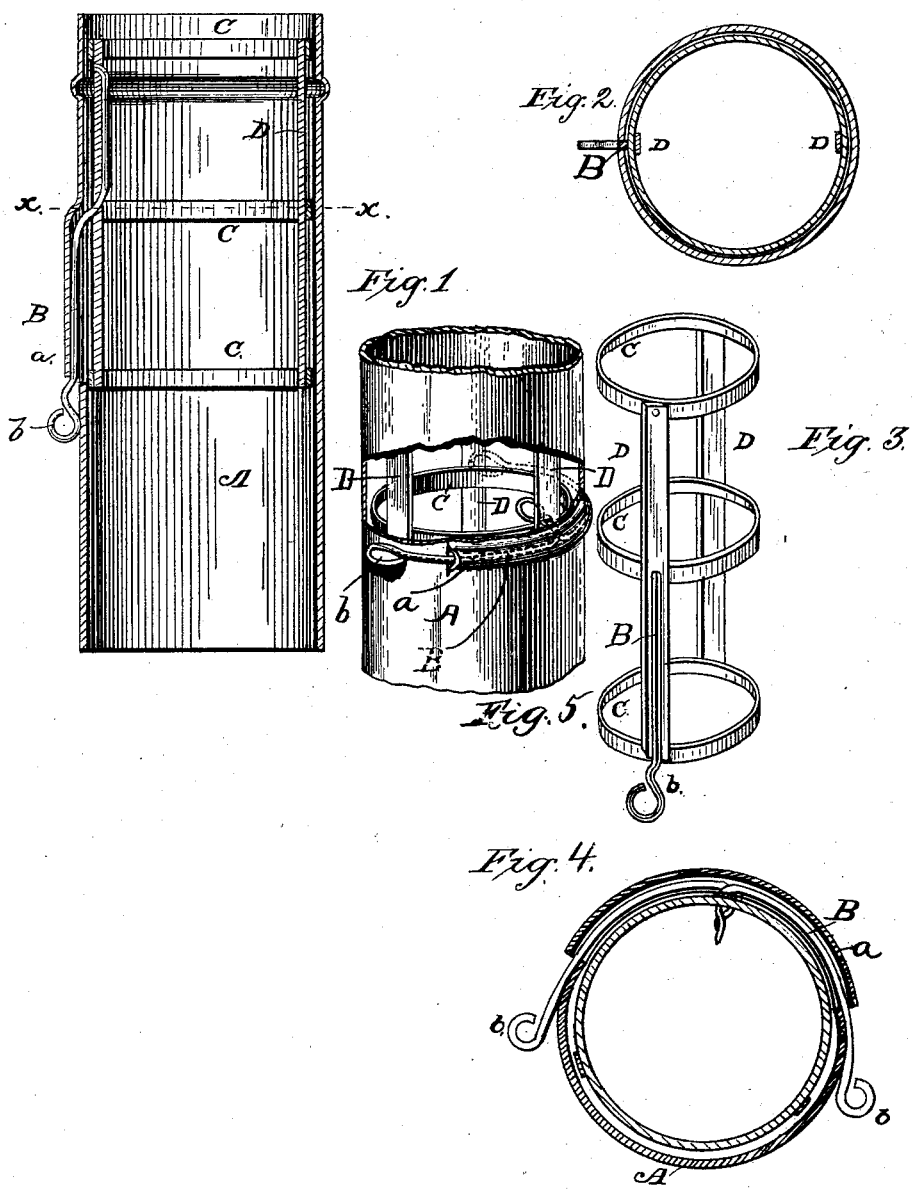

UNITED STATES PATENT OFFICE.

BYERS WYLIE HUEY, OF WINDSOR, MISSOURI.

STOVE-PIPE CLEANER.

SPECIFICATION forming part of Letters Patent No. 364,255, dated June 7, 1887.

Application filed February 15, 1886. Serial No. 192,051. (No model.)

*To all whom it may concern:*

Be it known that I, BYERS WYLIE HUEY, a citizen of the United States, residing at Windsor, in the county of Henry and State of Missouri, have invented certain new and useful Improvements in Stove-Pipe Cleaners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to stove-pipe cleaners; and it consists in the novel details of construction shown, and hereinafter more fully set forth and claimed.

In the drawings, Figure 1 is a longitudinal section of a joint of pipe embodying my invention. Fig. 2 is a section on the line X X of Fig. 1. Fig. 3 is a perspective view of the scraping device. Fig. 4 is a cross-section of a pipe, showing a different means of operating the scrapers; and Fig. 5 is a perspective view, parts broken away, of the modification of which Fig. 4 is a transverse section.

In carrying out my invention a joint of pipe, A, of any shape in cross section, is made use of, and a portion of the same is swaged outward, either in a longitudinal direction or at right angles to the bore of the pipe, to form a guide, $a$, for the reception of the scraper-operating rod B.

The scraper is composed of a number of rings, C, of a shape conforming to the pipe in cross-section. These rings are united by strips D to form a series, as most clearly shown in Fig. 3. In practice the scraper is placed within the joint of pipe, with its operating-rod B located in the guide. Fig. 1 shows the guide extending lengthwise of the pipe. Consequently the scraper in operation receives a reciprocatory motion. In Figs. 4 and 5 the guide is shown at right angles to the bore of the pipe, and the operating-rod protrudes on each side thereof a sufficient distance to permit a partial rotary movement of the scraper. The protruding end or ends of the rod B terminate in rings $b$, forming a handle by which the scraper may be more readily operated.

I am aware that it is a common expedient to provide smoke-pipes with cleaners or scrapers located therein, and which are actuated by operating-rods either supported in brackets fastened to the inner walls of the pipe or passed through caps closing the ends of the pipe, and do not claim such construction as forming a part of my invention. By my construction each joint of pipe has its own cleaner, and the several joints can be readily taken apart or put together without causing any inconvenience. So far as I am aware it is new to provide a single joint of pipe with a scraper or cleaner and to swage a part of the pipe to form a guideway in which the operating-rod is seated and by which the scraper is limited in its movements.

Having thus described my invention, what I claim, and desire to secure by Letters Patent, is—

1. The combination, with a single joint of stove-pipe having a portion swaged therefrom, forming a guideway, of the operating-rod seated in and guided in its movements by said guideway, and the scraper, substantially as and for the purpose described.

2. The combination, with the joint of pipe having a portion swaged therefrom, forming a guideway at right angles to the length of said pipe, of a scraper located in the pipe and the operating-rod seated in said guideway and having its ends projected through opposite ends thereof, substantially as and for the purpose described.

In testimony whereof I affix my signature in presence of two witnesses.

BYERS WYLIE HUEY.

Witnesses:
F. L. BAIRD,
WM. GOFORTH.